United States Patent
Huang

(10) Patent No.: US 12,461,575 B2
(45) Date of Patent: Nov. 4, 2025

(54) THERMAL CONTROL SYSTEM AND THERMAL CONTROL METHOD THEREOF

(71) Applicant: Wistron Corporation, New Taipei (TW)

(72) Inventor: Tsungsheng Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 435 days.

(21) Appl. No.: 18/301,983

(22) Filed: Apr. 17, 2023

(65) Prior Publication Data

US 2024/0241555 A1 Jul. 18, 2024

(30) Foreign Application Priority Data

Jan. 18, 2023 (TW) ................. 112102411

(51) Int. Cl.
*G06F 1/20* (2006.01)
*G06N 3/04* (2023.01)

(52) U.S. Cl.
CPC ............... *G06F 1/206* (2013.01); *G06N 3/04* (2013.01)

(58) Field of Classification Search
CPC . G06F 1/206; G06N 3/04; G06N 3/08; G05D 23/30
USPC ........................................................ 700/300
See application file for complete search history.

(56) References Cited

U.S. PATENT DOCUMENTS

| 4,162,379 A | * | 7/1979 | Sebens | G05D 23/2401 219/130.33 |
| 8,897,925 B2 | | 11/2014 | Chen et al. | |
| 2013/0158738 A1 | | 6/2013 | Chen et al. | |
| 2022/0016846 A1 | * | 1/2022 | Luan | B33Y 30/00 |
| 2022/0087075 A1 | * | 3/2022 | Heydari | G06N 3/088 |
| 2024/0281647 A1 | * | 8/2024 | Meulemans | G06N 3/044 |

FOREIGN PATENT DOCUMENTS

| TW | 201324188 | 6/2013 |
| TW | 201719424 | 6/2017 |

* cited by examiner

*Primary Examiner* — Chun Cao
(74) *Attorney, Agent, or Firm* — JCIPRNET

(57) ABSTRACT

In a thermal control system and a thermal control method thereof, the thermal control system includes a processing circuit, a control circuit, and a detection circuit. The processing circuit receives input parameters related to temperature and outputs a first signal. The input parameters are correlated with each other. The control circuit couples the processing circuit and receives the first signal. The control circuit performs a computation of a neural network algorithm based on the first signal and outputs a control signal to simultaneously adjust a plurality of target parameters based on the computation result of the neural network algorithm. The detection circuit couples the control circuit and the processing circuit, receives the updated target parameters, determines whether the updated target parameters converge to the corresponding pre-determined values, and outputs a feedback signal to the processing circuit.

20 Claims, 8 Drawing Sheets

THERMAL CONTROL SYSTEM AND THERMAL CONTROL METHOD THEREOF

CROSS-REFERENCE TO RELATED APPLICATION

This application claims the priority benefit of Taiwan application serial no. 112102411, filed on Jan. 18, 2023. The entirety of the above-mentioned patent application is hereby incorporated by reference herein and made a part of this specification.

BACKGROUND

Technical Field

The disclosure relates to a thermal control device, a thermal control system and a thermal control method thereof.

Description of Related Art

Along with advancement of science and technology and in response to arising demands, many simulation software, drawing software and game software on either a desktop computer or a laptop all require high-performance computing power and a large amount of central processing unit (CPU) resources. In order to improve the working efficiency of the CPU to cope with highly complex calculations and applications, to operate and maintain the CPU at a high clock rate will be a direction of efforts. In order for the CPU to operate in a high clock range and maintain at a chip limit or greater than a chip upper limit (overclocking, OC), a heat source generated by a corresponding chipset must also be quickly taken away and dissipated. If a rated support tolerance temperature of the chipset is exceeded, uncertain abnormality will occur in the system. Therefore, in order to achieve stability of the system and maintain at a high clock working efficiency output, it is important to develop a thermal control device and system with higher efficiency and capable of monitoring temperature changes at any time to maintain a working temperature.

Most of early heat dissipation modules used air of a room temperature as a medium, and were applied to computer heat dissipation modules along with evolution of the heat dissipation modules, and then along with the needs of users, heat dissipation through air cooling or liquid cooling or by integrating the above two means has evolved. However, since the air cooling is implemented by using the air of a room temperature (for example, 25°) as a medium, a heat dissipation efficiency thereof is limited. When the CPU needs to instantaneously operate at a frequency higher than a rated frequency value of the specification, a heat source and wattage generated at the moment will be instantaneously greater than a thermal design power (TDP). At this time, if only the air of the room temperature is used to dissipate heat, an effect of solving the instantaneous high temperature generated by the CPU is relatively limited. A thermal control method of today's computer system is to control a fan speed by the machine in a switch mode when a specified temperature is reached.

Most of the thermal control methods of conventional machines are based on a system temperature read by a thermal sensor, and the corresponding fan speed is found by using a table lookup method to control and change the fan speed, so as to use an airflow generated by the fan to take away the heat to achieve an effect of thermal control. However, this method is to control the same type of components (for example, controlling the fan speed) by sensing or monitoring the environmental parameters or thermal parameters related to temperature (for example, the parameters related to temperature measured by the thermal sensor) in the corresponding components, without considering other environmental parameters related to temperature (such as power consumption, fan noise, etc.), and thus cannot control outputs of different types of components (for example, display of light emitting diode (LED), frequency up/down conversion and power control of central processing unit (CPU) or graphics processing unit (GPU), etc.

On the other hand, the conventional method of controlling the fan speed by using the table lookup method mostly uses a fixed temperature range to set the fan speed. For example, when the temperature is between 25° C. and 35° C., the fan speed is 35%, and when the temperature is between 36° C. and 45° C., the fan speed is 45%, and it is impossible to achieve fine control for each temperature. Therefore, the fan speed control method not only cannot respond in real-time, but also tends to have switching losses that cannot reach accurate control.

In addition, existing thermal control devices are unable to monitor an overall impact of all parameters related to temperature on the machine at any time. In other words, it is impossible to perform overall control through the information of multiple controllable components corresponding to various parameters related to temperature.

SUMMARY

The disclosure is directed to a thermal control system and a thermal control method thereof, which are adapted to effectively improve thermal control accuracy and efficiency.

Some embodiments of the disclosure provide a thermal control system including a processing circuit, a control circuit, and a detection circuit. The processing circuit receives input parameters related to temperature and correlated with each other and outputs a first signal. The control circuit is coupled to the processing circuit and receives the first signal. The control circuit performs a computation of a neural network algorithm based on the first signal and outputs a control signal to simultaneously adjust a plurality of first target parameters to become a plurality of corresponding second target parameters based on a computation result of the neural network algorithm. The detection circuit is coupled to the control circuit and the processing circuit, receives the adjusted second target parameters, determines whether the adjusted second target parameters converge to a plurality of corresponding predetermined values, and outputs a feedback signal to the processing circuit to update the input parameters.

Some embodiments of the disclosure provide a thermal control method. The thermal control method includes: receiving a plurality of input parameters related to temperature and correlated with each other and outputting a first signal; performing computation of a neural network algorithm based on the first signal, and outputting a control signal to simultaneously adjust a plurality of first target parameters to become a plurality of corresponding second target parameters based on a computation result of the neural network algorithm; and determining whether the second target parameters converge to a plurality of corresponding predetermined values, and outputting a feedback signal.

Based on the above description, the thermal control system and thermal control method of the disclosure adopt a neural network algorithm framework to achieve computation of multiple correlated input parameters and control of multiple target parameters. The control method has higher linearity than the general method, and may achieve finer control, and an input-output relationship curve is more linear and continuous. In addition, better thermal control effect is achieved by using this framework without additional use of other hardware frameworks.

To make the aforementioned more comprehensible, several embodiments accompanied with drawings are described in detail as follows.

DESCRIPTION OF THE EMBODIMENTS

Figure 1:
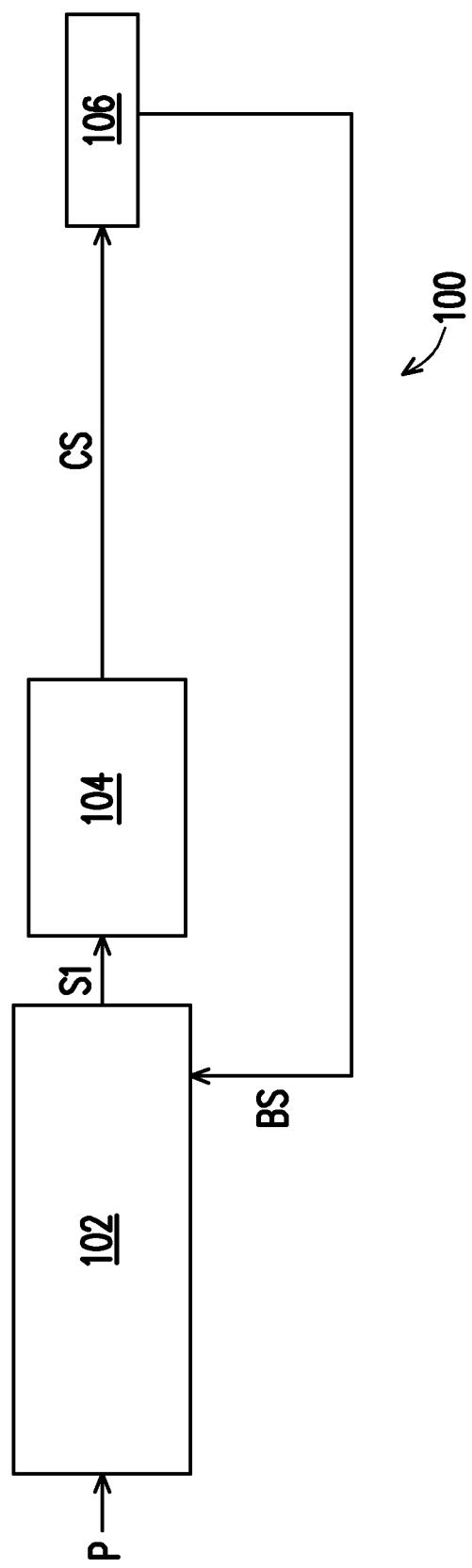
FIG. 1 is a schematic diagram of a thermal control system according to an embodiment of the disclosure.

Features of concepts of the inventive and methods of achieving the same may be more easily understood by referring to the following detailed description of the embodiments and the accompanying drawings. In the following description, embodiments will be described in more detail with reference to the accompanying drawings, where like reference numerals refer to like elements throughout. However, the disclosure may be embodied in different forms, and the disclosure is not limited to the embodiments provided below. Rather, these embodiments are provided as examples so that the disclosure will be thorough and complete, and will fully convey the aspects and features of the disclosure to those skilled in the art. Therefore, processes, elements and techniques that are not necessary for a person of ordinary skill in the art to fully understand the aspects and features of the disclosure may not be described. Unless otherwise indicated, like reference numerals denote like elements throughout the accompanying drawings and written description, and thus description thereof will not be repeated. In the drawings, the relative sizes of elements, layers and regions may be exaggerated for clarity's sake.

In the following description, for purposes of explanation, numerous specific details are set forth in order to provide a thorough understanding of various embodiments. It is evident, however, that various embodiments may be practiced without these specific details or with one or more equivalent arrangements. In other instances, well-known structures and devices are shown in block diagram form in order to avoid unnecessarily obscuring the various embodiments.

The terminology used herein is for the purpose of describing particular embodiments and is not intended to be limiting of the disclosure. As used herein, the singular forms "a/an" is intended to include the plural forms as well, unless the context clearly indicates otherwise. It will be further understood that the terms "comprises/comprising," "have/having," "includes/including" when used herein, specify the presence of stated features, regions, integers, steps, operations, elements, and/or components, but do not preclude the presence or addition of one or more other features, regions, integers, steps, operations, elements, components, and/or groups thereof. As used herein, the term "and/or" includes any and all combinations of one or more of the associated listed items.

As used herein, the terms "substantially", "about", "approximately" and similar terms are used as terms of approximation and not as terms of degree, and are intended to take into account inherent deviation in measured or calculated values to be identified by those skilled in the art. Considering the discussed measurement and an error associated with the measurement of a specific amount (i.e., limitation of a measurement system), as used herein, "about" or "approximately" includes the stated value and means within an acceptable range of the deviation of a specific value determined by an ordinary technician skilled in the art. For example, "about" may mean within one or more standard deviations, or within ±30%, 20%, 10%, 5% of the stated value. Additionally, the use of "may" when describing the embodiments of the disclosure means "one or more embodiments of the disclosure."

When an embodiment may be implemented differently, a particular order of processing may be executed differently than that described. For example, two consecutively described processes may be performed substantially simultaneously or in an order reverse to the described order.

Various embodiments are described herein with reference to cross-sectional diagrams that are schematic illustrations of embodiments and/or intermediate structures. Therefore, variations from the illustrated shapes as a result of, for example, manufacturing techniques and/or tolerances are to be expected. Furthermore, for the purpose of describing embodiments according to the concepts of the disclosure, specific structural or functional descriptions disclosed herein are merely illustrative. Thus, embodiments disclosed herein should not be construed as limited to the particular illustrated shapes of regions but are to include deviations in shapes that result, for example, from manufacturing.

Electronics or electronic devices according to an embodiment of the disclosure and/or any other related device or element described herein may be implemented by using any suitable hardware, firmware (such as an application specific integrated circuit), software or a combination of firmware and hardware. For example, various elements of these devices may be formed on one integrated circuit (IC) chip or on separate IC chips. In addition, various elements of these devices may be implemented on a flexible printed circuit film, a tape carrier package (TCP), a printed circuit board (PCB), or formed on a substrate. Moreover, the various elements of these devices may be processes or threads running on one or more processors in one or more computing devices that execute computer program instructions, and interact with other system elements for performing the various functions described herein. The computer program instructions are stored in a memory that may be implemented in computing devices using standard memory devices such as random access memories (RAM). The computer program instructions may also be stored on other non-transitory computer readable media such as CD-ROMs, flash memory drives, or the like. In addition, those skilled in the art should know that the functionality of various computing devices may be combined or integrated into a single computing device, or that the functionality of a particular computing device may be distributed to one or more other computing devices without departing from the spirit and scope of the exemplary embodiments of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of a thermal control system according to an embodiment of the disclosure. Referring to FIG. 1, a thermal control system 100 may include a processing circuit 102, a control circuit 104, and a detection circuit 106. The processing circuit 102 may receive a plurality of input parameters P from an external environment or other devices and output a first signal S1. These input parameters P are related to temperature. In addition, the multiple input parameters P may be positively correlated, negatively correlated, linearly correlated or nonlinearly correlated with each other, which is not limited by the disclosure. For example, these input parameters may be at least one or a combination of a thermal parameter (unit: T), a system power consumption parameter (unit: W), and a noise parameter (unit: dB), which are not limited by the disclosure. Therefore, the first signal S1 includes at least one or a combination of information of the thermal parameter, information of the system power consumption parameter, and information of the noise parameter.

In an embodiment, the thermal parameter, the system power consumption parameter and the noise parameter are correlated to each other. In other words, each of the thermal parameter, the system power consumption parameter and the noise parameter has at least one variable related to temperature. Specifically, in an embodiment, the thermal parameter may represent a relationship between a system, a device or a circuit and temperature. In an embodiment, the system power consumption parameter may represent a power consumption level of a system, a device, a CPU, a GPU, a circuit or other hardware. In an embodiment, the noise parameter may represent noise generated by a system, a device, a fan, a motor, or a buzzer.

In the embodiment, the control circuit 104 is coupled to the processing circuit 102. The control circuit 104 is configured to receive the first signal S1, and performs a computation of a neural network algorithm according to the first signal S1. Moreover, the control circuit 104 outputs a control signal CS according to a computation result of the neural network algorithm. In the embodiment, the control signal CS may be used to simultaneously adjust or control a plurality of target parameters of a plurality of devices. In some embodiments, each device may have a plurality of target parameters. For example, these target parameters include at least one of or a combination of an LED color parameter, a fan speed parameter, a water cooling control parameter, a CPU underclocking parameter, a GPU underclocking parameter, a fan noise parameter, a power control parameter, and a port speed parameter, which is not limited by the disclosure. In some embodiments, the control signal CS has information of a plurality of different control signals, and these different control signals respectively control corresponding systems or devices. In some embodiments, the number of the target parameters may be greater than or equal to the number of the input parameters P.

In the embodiment, the detection circuit 106 is coupled to the control circuit 104 and the processing circuit 102. The detection circuit 106 receives a plurality of target parameters adjusted by the control signal CS of the control circuit 104, and the detection circuit 106 may determine whether the adjusted target parameters have converged to a plurality of corresponding predetermined values, and output a feedback signal BS to the processing circuit 102. In an embodiment, the detection circuit 102 may preset the plurality of corresponding predetermined values for the plurality of target parameters according to the requirements of an ambient temperature of the system or an operating temperature of the device. In addition, the control circuit 104 may automatically control the thermal control system 100 to converge to the plurality of predetermined values according to the neural network algorithm under different environments and the plurality of input parameters P.

In the embodiment, the feedback signal BS includes information of differences between the adjusted target parameters and the corresponding predetermined values. For example, a difference between a thermal target parameter and a predetermined value of temperature is 1° C. (i.e., $\Delta T=1°$ C.). A difference between a power loss target parameter and a predetermined value of power loss is 20 watts (W) (i.e., $\Delta W=20$ W). A difference between a noise target parameter and a predetermined value of noise is 5 decibels (dB) (i.e., $\Delta dB=5$ dB).

Figure 2:
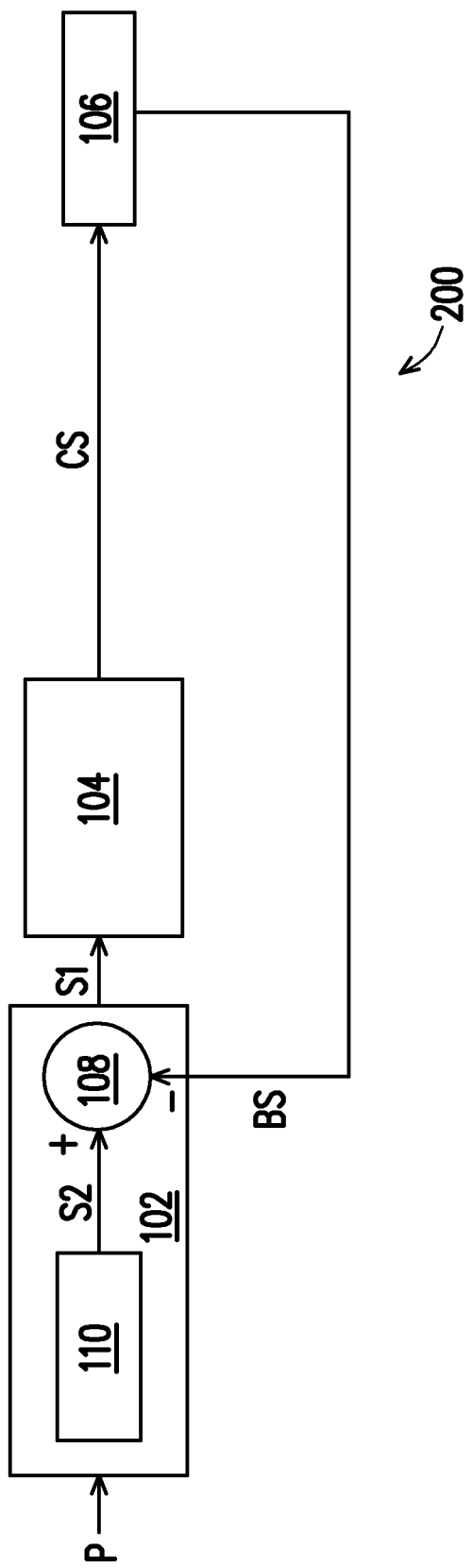
FIG. 2 is a schematic diagram of a thermal control system according to another embodiment of the disclosure.

FIG. 2 is a schematic diagram of a thermal control system according to another embodiment of the disclosure. Referring to FIG. 2, compared with the embodiment in FIG. 1, a thermal control system 200 of the embodiment includes a processing circuit 102, a control circuit 104 and a detection circuit 106, where the processing circuit 102 further includes a sensing circuit 110 and an adder 108. In the embodiment, the sensing circuit 110 is coupled to the processing circuit 102. The sensing circuit 110 may also sense a plurality of input parameters P, and output a second signal S2 according to the plurality of input parameters P. Where, the second signal S2 includes information of a plurality of input parameters respectively corresponding to a plurality of sensing targets. For example, the sensing target may be a motor, and corresponding input parameters thereof are, for example, a rotational speed of the motor and/or an input power of the motor. Alternatively, the sensing target may be a fan, and a corresponding input parameter thereof is, for example, a rotation speed of the fan or the number of turned-on fans.

In some embodiments, the sensing circuit 110 may be connected to a heat source (not shown). The heat source may be, for example, a central processing unit or a display chip that may generate heat during operation, but the disclosure is not limited thereto. In some embodiments, the sensing circuit 110 may sense a temperature of a heat conducting element (not shown) to generate a thermal sensing signal. The heat conducting element may for example, include metal materials with high thermal conductivity such as an aluminum alloy, a silver alloy or a copper alloy, etc. In some embodiments, the heat conducting element may be, for example, a metal container, which may be connected to a circulation pipeline in a water cooling device (not shown) of a heat dissipation module.

In some embodiments, the processing circuit 102 may be, for example, an embedded control chip, and the control circuit 104 may generate the control signal CS to a thermoelectric cooling chip of the detection circuit 106 according to the first signal S1. In some embodiments, the heat conducting element may be, for example, coupled to a cold surface of the thermoelectric cooling chip (not shown) of the detection circuit 106. The thermoelectric cooling chip may generate a hot surface and a cold surface according to a received voltage. The higher the voltage received by the thermoelectric cooling chip is, the larger a temperature difference between the hot surface and the cold surface is, in other words, the lower the temperature of the cold surface is, and the higher the temperature of the hot surface is. In some embodiments, the thermoelectric cooling chip may adjust the temperature of the cold surface of the thermoelectric cooling chip according to an output voltage, so as to adjust a temperature of the heat conducting element to dissipate heat from the heat source. For example, when the heat source is a central processing unit operating at high frequency and high performance, the thermoelectric cooling chip may effectively reduce the temperature of the central processing unit through the heat conducting element, so that the central processing unit may normally operate at high frequency and high performance.

In the embodiment, the adder 108 has a first terminal, a second terminal and a third terminal. The first terminal of the adder 108 is coupled to the sensing circuit 110 and receives the second signal S2. The second terminal of the adder 108 is coupled to the detection circuit 106 and receives the feedback signal BS transmitted by the detection circuit 106. The adder 108 puts the second signal S2 and the feedback signal BS (with information of a difference between the target values) together to update the original input parameters P, so that the updated input parameters gradually converge to the predetermined target value. The third terminal of the adder 108 outputs the first signal S1 having updated information of the plurality of input parameters. In some embodiments, the first terminal of the adder 108 is a positive input terminal, and the second terminal of the adder 108 is a negative input terminal. In some alternative embodiments, the first terminal of the adder 108 is a negative input terminal, and the second terminal of the adder 108 is a positive input terminal, where the positive and negative may be determined by a system design, which is not limited by the disclosure.

Figure 3:
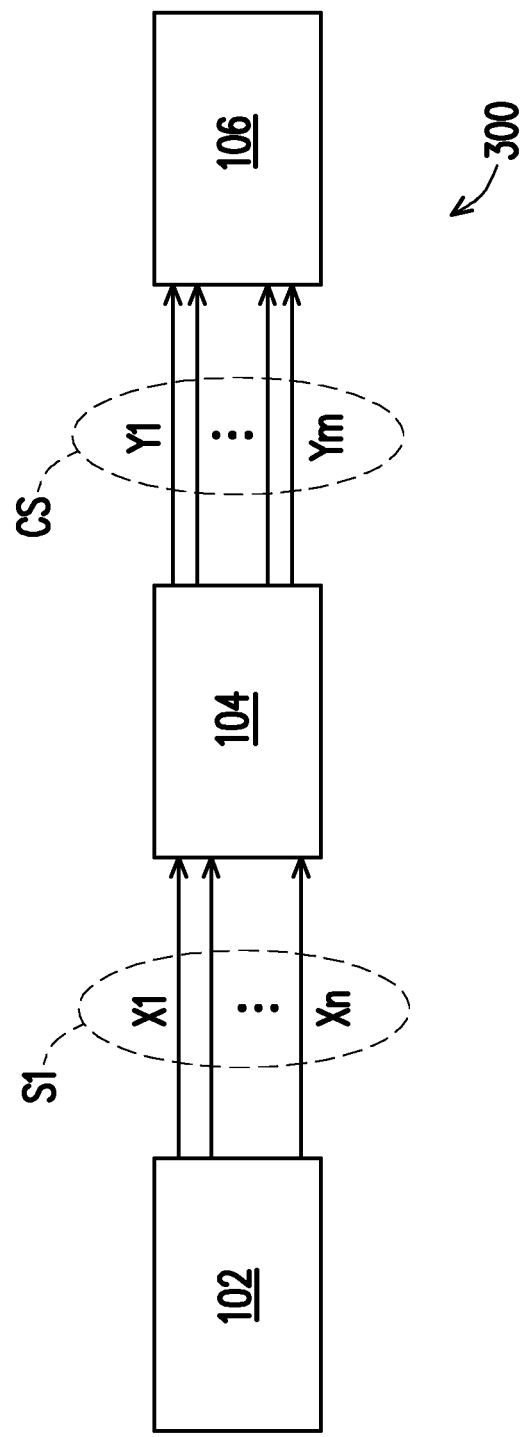
FIG. 3 is a schematic diagram of signal transmission of a thermal control system according to an embodiment of the disclosure.

FIG. 3 is a schematic diagram of signal transmission of a thermal control system according to an embodiment of the disclosure. Referring to FIG. 3, a thermal control system 300 includes a processing circuit 102, a control circuit 104 and a detection circuit 106. The processing circuit 102 may receive a plurality of input parameters from the external environment or other devices and output a first signal S1. The first signal S1 at least includes information of a plurality of input parameters (X1, . . . , Xn) such as information of the thermal parameter, information of the system power consumption parameter, and information of the noise parameter. The control circuit 104 receives the first signal S1, and outputs a control signal CS to simultaneously control multiple devices after computation of the neural network-like algorithm. The control signal CS at least includes information of a plurality of output target parameters (Y1, . . . , Yn) such as an LED color parameter, a fan speed parameter, a water cooling control parameter, a CPU underclocking parameter, a GPU underclocking parameter, a fan noise parameter, a power control parameter, a port speed parameter, etc. For example, the LED color parameter at least includes whether one of the three colors of LEDs of red color, green color, and blue color or a combination thereof is turned on or off. On the other hand, the CPU or GPU underclocking parameter may include frequency up/down conversion parameters, and the control signal CS may adjust a corresponding power consumption of the CPU or the GPU by controlling a clock of the CPU or GPU. Alternatively, the water cooling control parameter may be controlled by the control signal to determine whether to activate a water cooling system to assist cooling of a target system or device.

Figure 4:
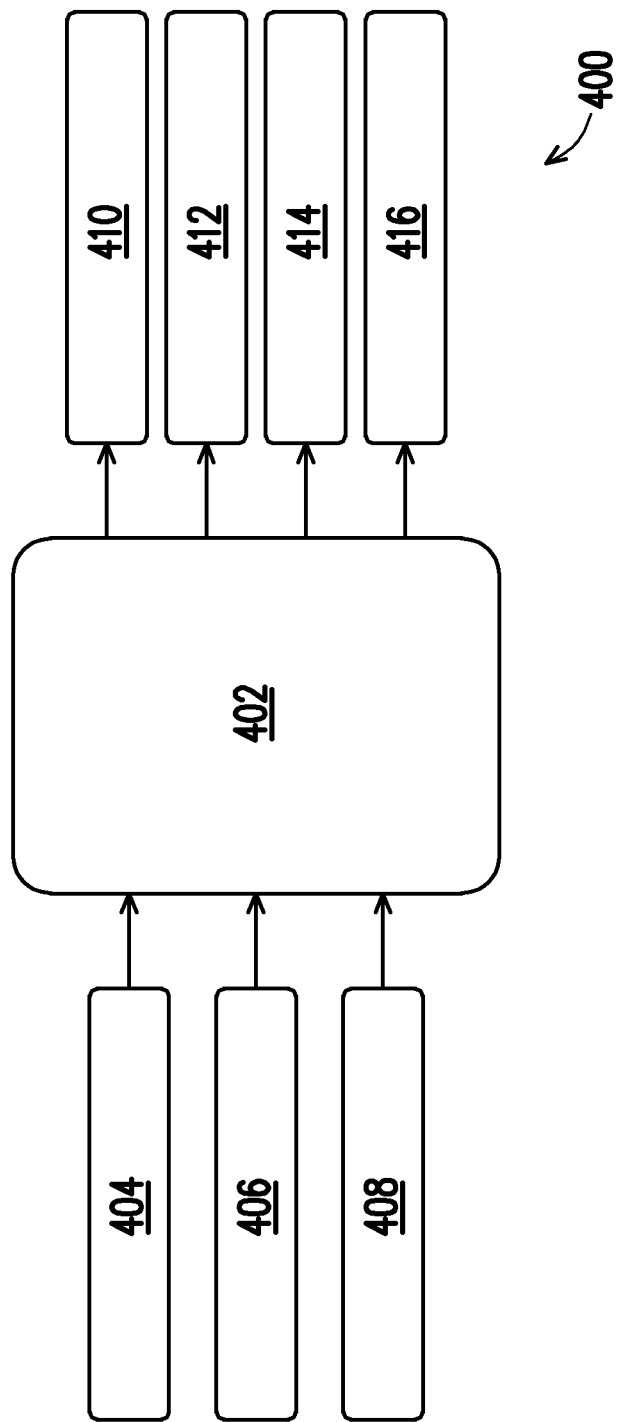
FIG. 4 is a schematic diagram of a hardware framework of a thermal control system according to an embodiment of the disclosure.

FIG. 4 is a schematic diagram of a hardware framework of a thermal control system according to an embodiment of the disclosure. Referring to FIG. 4, in the embodiment, a hardware device of a thermal control system 400 includes a system processor 402, a temperature sensor 404, a power monitor 406, a noise sensor 408, a light emitting diode (LED) 410, a fan or water cooling system 412, a processor 414 (for example, the processor may be a CPU, a digital signal processor (DSP), a micro-processor unit (MPU), a GPU, a microcontroller unit (MCU)) and a port speed system 416, but the disclosure is not limited thereto. In some embodiments, the system processor 402 is electrically connected to the temperature sensor 404, the power monitor 406 and the noise sensor 408. The system processor 402 performs a computation of a neural network algorithm on the input parameters received from the temperature sensor 404, the power monitor 406, and the noise sensor 408, and then transmits a computation result to the LED 410, the fan or water cooling system 412, the CPU/GPU 414 and the port speed system 416 respectively electrically connected to the output terminal of the system processor 402, and adjust or update the corresponding target parameters. The computation of the neural network algorithm is described in detail below.

Figure 5:
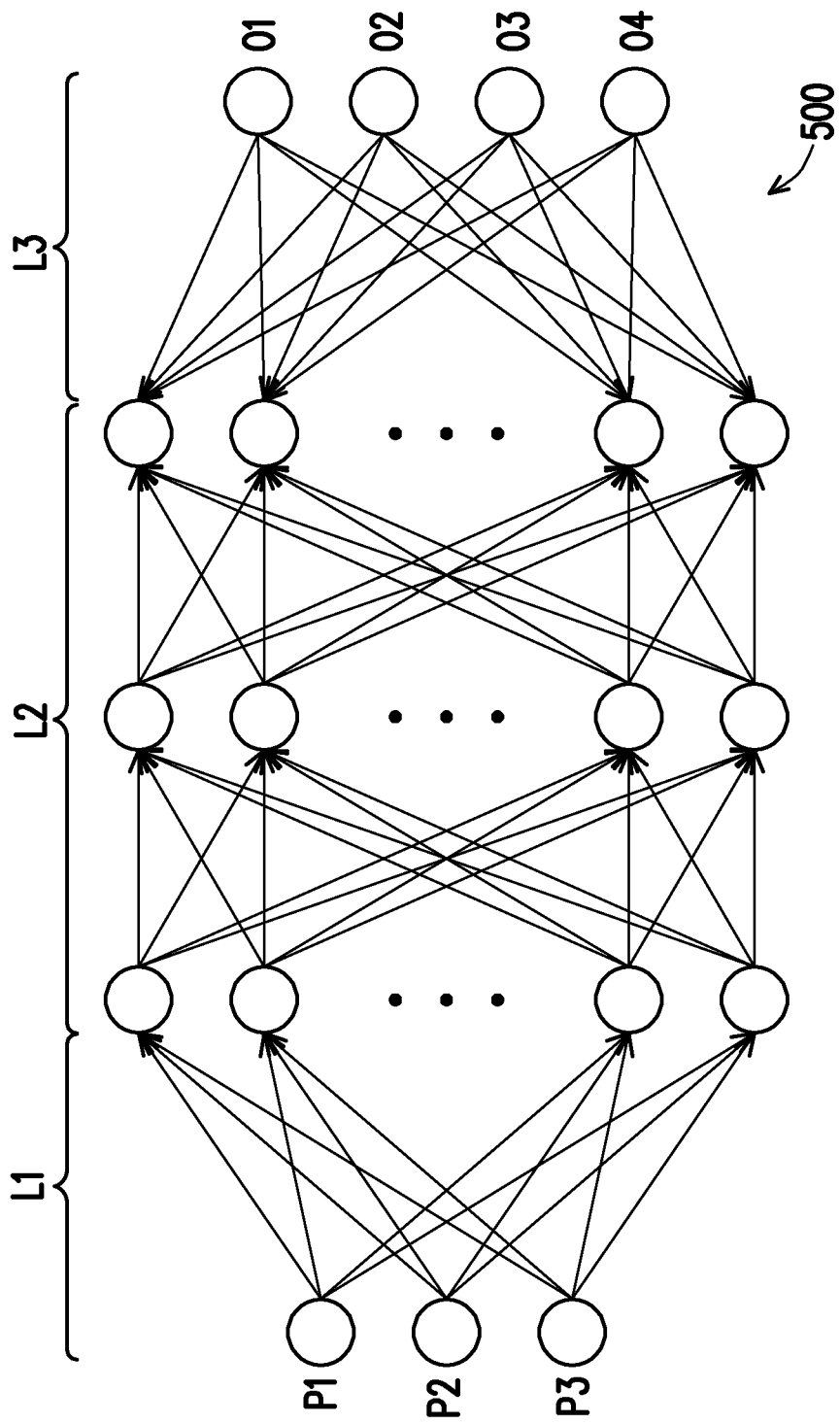
FIG. 5 is a schematic diagram of a neural network algorithm model according to an embodiment of the disclosure.
Figure 6:
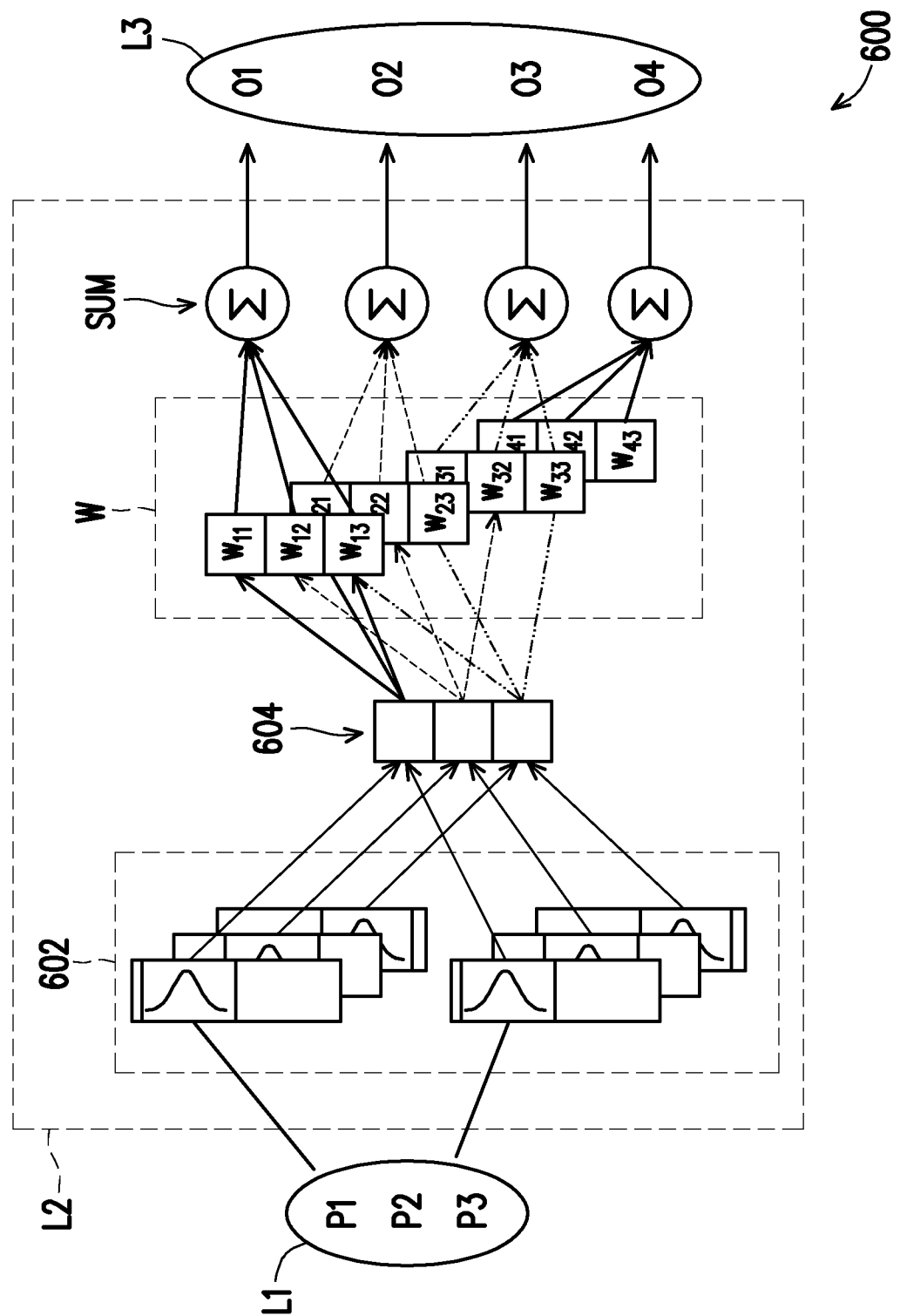
FIG. 6 is a schematic diagram of a cerebellar model articulation controller (CMAC) framework according to an embodiment of the disclosure.

FIG. 5 is a schematic diagram of a neural network algorithm model according to an embodiment of the disclosure, and FIG. 6 is a schematic diagram of a cerebellar model articulation controller framework according to an embodiment of the disclosure. Referring to FIG. 5 and FIG. 6 at the same time.

In the embodiment, a neural network algorithm model 500 uses a cerebellar model articulation controller (CMAC) framework 600. The CMAC uses a set of index indicators to generate corresponding memory addresses for different input parameters P1, P2, and P3 to read data in a memory space, and uses the data content in the memory space to generate a set of output target parameters, and a difference between the information of the output target parameters and an expected output (i.e., the predetermined target value) may be fed back to the memory space to adjust the data content in the original memory space. After multiple feedback adjustments, the learning is stopped until the output target parameters converge to an allowable error range or meet the predetermined target value. In the embodiment, the CMAC includes at least three layers, each layer has corresponding neurons, and the three layers include an input layer L1, a hidden layer L2, and an output layer L3. In the embodiment, the input layer L1 receives a plurality of input parameters P1, P2, P3, but the embodiment does not limit the number of the input parameters. In the embodiment, the hidden layer L2 is coupled to the input layer L1, and performs a supervisory operation or a supervisory learning operation according to the plurality of input parameters P1, P2, P3. In the embodiment, the output layer L3 is coupled to the hidden layer L2, and outputs a plurality of target parameters O1, O2, O3, O4 to be controlled by the thermal control system according to the result of the supervisory operation, but the embodiment does not limit the number of the target parameters. In some embodiments, each input parameter may be divided into multiple character (or state) parameters, and the number of the divided character parameters has a high correlation with the learning effect of the CMAC. These character parameters may be used as a sampling function during the CMAC learning operation. In some embodiments, the memory spaces allocated to each character parameter may overlap with each other.

Referring to FIG. 6, in the embodiment, the hidden layer L2 includes an association layer 602, where the association layer 602 has multiple groups of association spaces, and each group of the association spaces has a plurality of character functions. To be specific, each group of the association spaces has multiple layers of memory spaces, and each layer of the memory spaces has a corresponding character function. In some embodiments, the multiple character functions in the same group are correlated with each other. In an embodiment, the character function uses a Gaussian function as a basis function to replace a constant function, so as to improve a learning ability of the CMAC. In particular, not only differential information between the output and the input may be preserved, but also learning accuracy is relatively good, where comparison of the learning performance is evaluated by using root mean square error. It should be noted that the Gaussian basis function only has an effect on a hypercube of the corresponding layer when performing operations, and has no effect on hypercubes of other layers. In an embodiment, the character function may also use other basis functions. In some embodiments, the association layer 602 receives multiple input parameters P1, P2, P3, and performs an inner product operation on the association space corresponding to the multiple input parameters P1, P2, P3 and the Gaussian function.

In the embodiment, the hidden layer L2 further includes a receptive field 604, and the receptive field 604 has a plurality of hypercube spaces, and each hypercube space is a memory space at different layers formed by mapping a result of the inner product operation on the association space and the Gaussian function. In some embodiments, the number of the hypercube spaces is positively related to the memory space required by the thermal control system. Or, in some embodiments, the number of the hypercube spaces is equal to the memory space required by the thermal control system. In some embodiments, among the multiple input parameters P1, P2, and P3, the input parameters with higher correlation shares a greater number of the hypercube spaces. For example, the correlation between the input parameter P1 (for example: the fan speed) and the input parameter P2 (for example: the fan power loss) is 70%, and the number of the shared hypercube spaces is 3. The correlation between the input parameter P3 (for example: the number of activated fans) and the input parameter P2 (for example: the fan power loss) is 90%, and the number of the shared hypercube spaces is 6, where computation of the correlation depends on a computation result of the input parameters and the CMAC algorithm, which is not limited by the disclosure. In some embodiments, the number of the input parameters P1, P2, and P3 is the same as the number of the hypercube spaces (or the number of regions of the divided memory space). In some embodiments, the input parameters may be represented by univariate or multivariate matrices. In some embodiments, the input parameter data of different states or characters may be stored in memory spaces pointed by the hypercube spaces of different layers.

In the embodiment, the hidden layer L2 further includes a weight layer W, and the weight layer W includes multiple groups of weight spaces (for example: $W_1=(w_{11}, w_{12}, w_{13})$, $W_2=(w_{21}, w_{22}, w_{23})$, $W_3=(w_{31}, w_{32}, w_{33})$), each group of the weight spaces has multiple weighting vectors (for example: $(w_{11}, w_{12}, w_{13})$, $(w_{21}, w_{22}, w_{23})$, $(w_{31}, w_{32}, w_{33})$) preset according to a boundary value of the target parameters of the thermal control system. In the embodiment, each hypercube space is operated with the corresponding weighting vector, and then an algebraic sum operation ($\Sigma$) SUM is performed to obtain an output of the hidden layer L2, and the output of the hidden layer L2 is then transmitted to the output layer L3. Therefore, the output layer L3 has output target parameters O1, O2, O3, and O4 calculated by the CMAC algorithm. In some embodiments, the number of the input parameters and the number of the output target parameters are not limited. In some embodiments, the output target parameters may be represented by univariate or multivariate matrices.

In an embodiment, a matrix P formed by the input parameters P1, P2, and P3 may be expressed as $P=[P_1, P_2, P_3]$, and a matrix O formed by the output target parameters O1, O2, O3, O4 may be expressed as $O=[O_1, O_2, O_3, O]$, where the thermal parameter ($P_1$) ranges from 0° C. to 125° C. (i.e., $P_1 \in [0,125]$), the power consumption (loss) parameter ($P_2$) ranges from 0 W to 1500 W (i.e., $P_2 \in [0,1500]$), and the noise parameter ($P_3$) ranges between 0 dB and 150 dB (i.e., $P_3 \in [0,150]$), where the target parameter $O_1$ may be, for example, an LED color parameter, the target parameter $O_2$ may be, for example, a fan system or a water cooling control parameter, the target parameter $O_3$ may be, for example, a clock frequency up/down conversion parameter of CPU/GPU, and the target parameter $O_4$ may be, for example, a disable (or enable) interface input/output port parameter, and the above is only an example and is not intended to be limiting of the disclosure.

Figure 7:
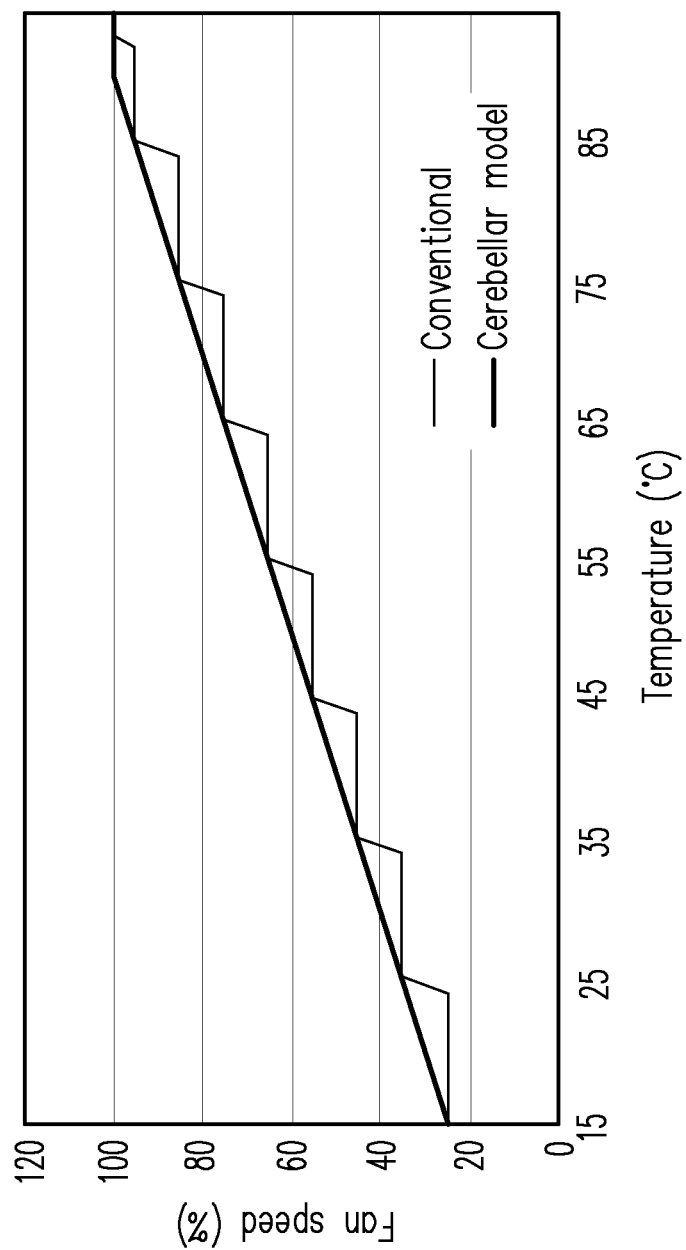
FIG. 7 is a curve diagram showing a relationship between CMAC and a fan speed according to an embodiment of the disclosure.

FIG. 7 is a curve diagram showing a relationship between the CMAC and the fan speed according to an embodiment of the disclosure. Referring to FIG. 7, generally, the thermal monitoring technology is limited to correspondingly controlling a target device or target system for a same type of environmental parameter, and cannot simultaneously control multiple controllable target devices or target systems corresponding to multiple types of associated input parameters. In addition, the general thermal control uses a look-up table to control the output parameters of the target device or target system, and it is unable to make precise control for each situation. Comparatively, as shown in FIG. 7, to use a CMAC computation model may effectively improve linearity of the relationship curve between the input parameters and the output target parameters, and a trend of the curve is more continuous. For example, the relationship between the fan speed and the system temperature is uncertain, but the fan speed may indirectly affect the change of the system temperature. By using the target output parameters of the control circuit to adaptively adjust or control the fan speed may optimize the relationship between an overall temperature and the fan speed of the system, thus indirectly allowing the running CPU to achieve the best performance.

Figure 8:
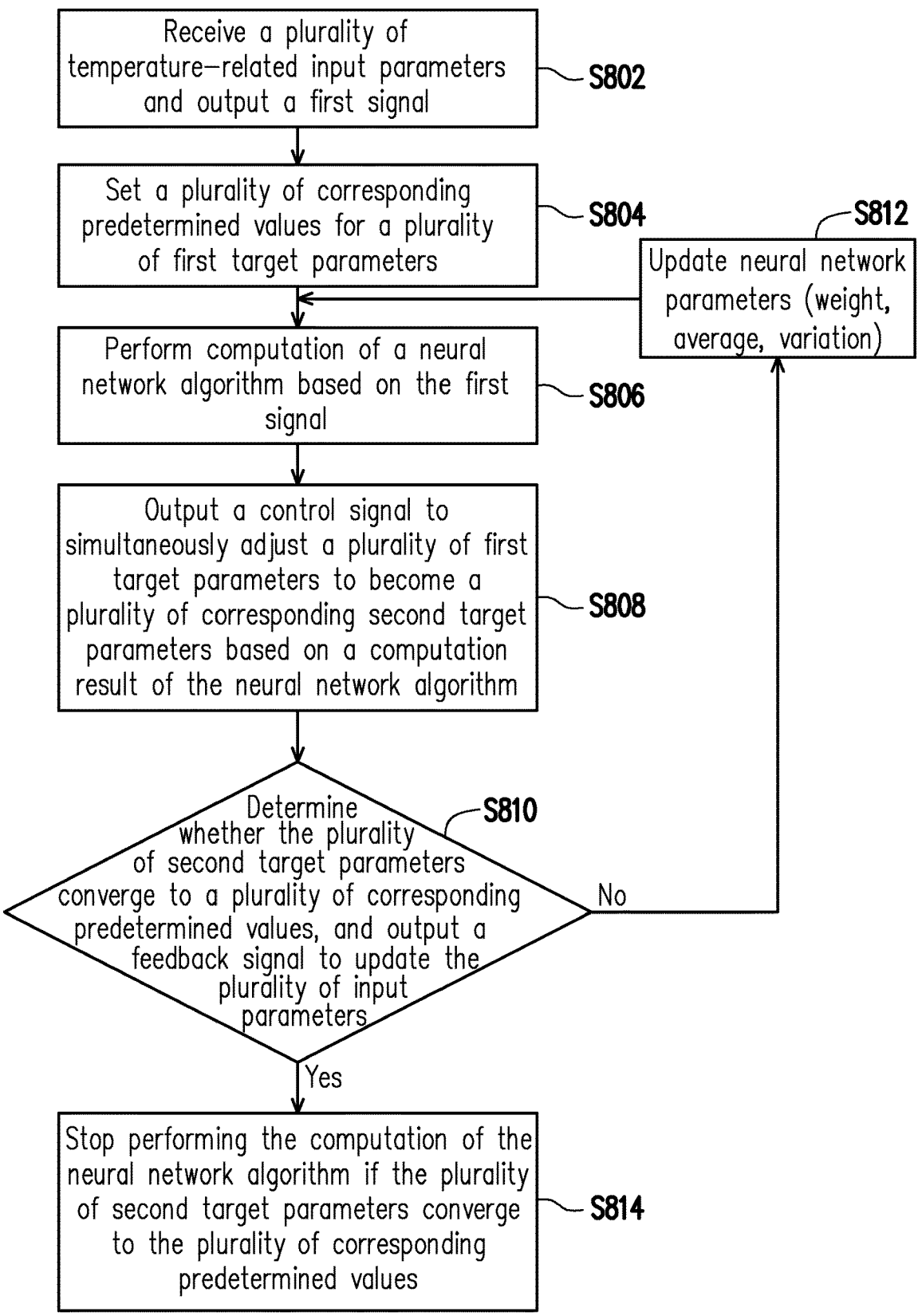
FIG. 8 is a flowchart of a thermal control method of a thermal control system according to an embodiment of the disclosure.

FIG. 8 is a flowchart of a thermal control method of a thermal control system according to an embodiment of the disclosure. Referring to FIG. 8, it may be known from the above embodiments that the thermal control method of the thermal control system may include following steps S802-S814. First, after receiving the input parameters (step S802) and setting target values of first target parameters (step S804), the system enters a control process. To be specific, in step S802, a plurality of first input parameters related to temperature (temperature, system power consumption, fan noise) correlated to each other are received and a first signal is output. Then, in step S804, a plurality of corresponding predetermined values are set for a plurality of first target parameters. In other words, in step S804, a corresponding target value is set for the parameter to be controlled. Thereafter, in step S806, a commutation of a neural network algorithm (cerebellar network articulation controller or cerebellar model articulation controller) may be executed according to the first signal. In step S808, a control signal is output according to the computation result of the neural network algorithm to simultaneously adjust the plurality of first target parameters to become plurality of corresponding second target parameters. Then, in step S810, it is determined whether the adjusted plurality of second target parameters converge to the plurality of corresponding predetermined values, and a feedback signal is output to update the plurality of input parameters. For example, whether a temperature is less than 70° C., whether a fan noise is less than 80 dB, and whether a power loss is less than 1200 W. In step S812, if the target values are not satisfied, the controlled first target parameters (weight, average, variation) are updated, and use the updated parameters to carry out a new or next round of control until the updated parameters converge to the predetermined target values. In step S814, if the updated parameters converge to the corresponding predetermined values (or predetermined target values), the computation of the neural network-like algorithm is stopped. The control circuit still continues to monitor the multiple second target parameters in the system until the multiple second target parameters do not converge to the corresponding multiple predetermined values (or fail to reach multiple predetermined target values), and then enter a new round or a next round of parameter update and control. In other words, the control circuit continuously monitors the system, i.e., the control circuit remains in the original monitoring state and does not stop monitoring. If the updated multiple second target parameters outputted after the next round of computation of the cerebellar model (network) articulation controller on the updated input parameters converge to the multiple predetermined values, the updated multiple second target parameters are continuously monitored until the updated multiple second target parameters fail to converge to the multiple predetermined values again, and a next round of thermal control is performed. It should be noted that the control circuit will continue to monitor the system, and regardless of whether the second target parameters converge to the target values, the control circuit will continue to monitor the input parameters of the system. When the target value not converged to the target parameter is detected, the system enters a program of updating the parameters.

In an embodiment, the first signal includes at least information of the thermal parameter, information of the system power consumption parameter and information of the noise parameter, where the control signal controls a plurality of first target parameters. In addition, the plurality of first target parameters include at least two of an LED color parameter, a fan speed parameter, a water cooling control parameter, a CPU underclocking parameter, a GPU underclocking parameter, a fan noise parameter, and a port speed parameter, or any combination thereof.

In summary, the thermal control system and thermal control method of the disclosure adopt an algorithm framework of the CMAC to achieve computation of multiple correlated input parameters and control of multiple target parameters. The control method has higher linearity than the general method, and may achieve finer control, and an input-output relationship curve is more linear and continuous. In addition, better thermal control effect is achieved by using this framework without additional using other hardware frameworks.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A thermal control system, comprising:
    a processing circuit, receiving a plurality of input parameters related to temperature and outputting a first signal;
    a control circuit, coupled to the processing circuit and receiving the first signal, performing a computation of a neural network algorithm based on the first signal, and outputting a control signal to adjust a plurality of first target parameters related to temperature to become a plurality of corresponding second target parameters based on the computation of the neural network algorithm; and
    a detection circuit, coupled to the control circuit and the processing circuit, receiving the plurality of second target parameters, determining whether the plurality of second target parameters converge to a plurality of corresponding predetermined values, and outputting a feedback signal to the processing circuit to update the plurality of input parameters.

2. The thermal control system as claimed in claim 1, wherein the feedback signal comprises a difference between the plurality of second target parameters and the plurality of corresponding predetermined values.

3. The thermal control system as claimed in claim 1, wherein the processing circuit further comprises:
    a sensing circuit, coupled to the processing circuit, sensing the plurality of input parameters, and outputting a second signal according to the plurality of input parameters; and
    an adder, having a first terminal, a second terminal and a third terminal, wherein the first terminal is coupled to the sensing circuit and receives the second signal, the second terminal is coupled to the detection circuit and receives the feedback signal, and the adder puts the second signal and the feedback signal together to update the plurality of input parameters, and the third terminal outputs the first signal with the updated plurality of input parameters.

4. The thermal control system as claimed in claim 3, wherein the second signal comprises the plurality of input parameters respectively corresponding to a plurality of sensing targets.

5. The thermal control system as claimed in claim 3, wherein the first terminal is a positive input terminal, and the second terminal is a negative input terminal.

6. The thermal control system as claimed in claim 1, wherein the first signal at least comprises a thermal parameter, a system power consumption parameter, and a noise parameter.

7. The thermal control system as claimed in claim 1, wherein the control signal controls the plurality of first target parameters, and the plurality of first target parameters comprise at least two of a light-emitting diode color parameter, a fan speed parameter, a water cooling control parameter, a central processing unit underclocking parameter, a graphics processing unit underclocking parameter, a fan noise parameter, and a port speed parameter.

8. The thermal control system as claimed in claim 1, wherein a number of the plurality of first target parameters is greater than a number of the plurality of input parameters.

9. The thermal control system as claimed in claim 1, wherein the detection circuit presets the plurality of corresponding predetermined values for the plurality of first target parameters, and the control circuit automatically controls the thermal control system to converge to the plurality of predetermined values according to the neural network algorithm under different environments and the plurality of input parameters.

10. The thermal control system as claimed in claim 1, wherein the neural network algorithm uses a framework of a cerebellar model articulation controller.

11. The thermal control system as claimed in claim 10, wherein the cerebellar model articulation controller comprises at least three layers, each layer has corresponding neurons, and the three layers comprise:
an input layer, receiving the plurality of input parameters;
a hidden layer, coupled to the input layer, and performing a supervisory operation according to the plurality of input parameters; and
an output layer, coupled to the hidden layer, and outputting the plurality of first target parameters to be controlled by the thermal control system according to a result of the supervisory operation.

12. The thermal control system as claimed in claim 11, wherein the hidden layer comprises an association layer, the association layer has a plurality of groups of association spaces, and each of the groups of association spaces has a plurality of character functions correlated with each other, and the character functions use a Gaussian function as a basis function.

13. The thermal control system as claimed in claim 12, wherein the association layer receives the plurality of input parameters and performs an inner product operation on the association spaces corresponding to the plurality of input parameters and the Gaussian function.

14. The thermal control system as claimed in claim 13, wherein the hidden layer further comprises a receptive field, and the receptive field has a plurality of hypercube spaces, and each of the hypercube spaces is a memory space formed by mapping a result of the inner product operation, wherein a number of the plurality of hypercube spaces is positively correlated with a memory space required by the thermal control system.

15. The thermal control system as claimed in claim 14, wherein in the plurality of input parameters, the input parameters with higher correlation share a greater number of the hypercube spaces.

16. The thermal control system as claimed in claim 14, wherein a number of the plurality of input parameters is the same as a number of the plurality of hypercube spaces.

17. The thermal control system as claimed in claim 14, wherein the hidden layer further comprises a weight layer, and the weight layer comprises a plurality of groups of weight spaces, each of the groups of weight spaces has a plurality of weighting vectors preset according to a boundary value of the thermal control system.

18. The thermal control system as claimed in claim 17, wherein each of the hypercube spaces is operated with the corresponding weighting vector, and then an algebraic sum operation is performed to obtain an output of the hidden layer, and the output of the hidden layer is transmitted to the output layer.

19. A thermal control method, comprising:
receiving a plurality of input parameters related to temperature and outputting a first signal;
performing a computation of a neural network algorithm based on the first signal;
outputting a control signal to simultaneously adjust a plurality of first target parameters to become a plurality of corresponding second target parameters based on the computation of the neural network algorithm;
determining whether the plurality of second target parameters converge to a plurality of corresponding predetermined values, and outputting a feedback signal to update the plurality of input parameters; and
stopping performing the computation of the neural network algorithm if the plurality of second target parameters converge to the plurality of predetermined values.

20. The thermal control method as claimed in claim 19, further comprising:
setting a plurality of corresponding predetermined values for the plurality of first target parameters, wherein the first signal at least comprises a thermal parameter, a system power consumption parameter, and a noise parameter, wherein the control signal controls the plurality of first target parameters, and the plurality of first target parameters comprise at least two of a light-emitting diode color parameter, a fan speed parameter, a water cooling control parameter, a central processing unit underclocking parameter, a graphics processing unit underclocking parameter, a fan noise parameter, and a port speed parameter.

* * * * *